United States Patent [19]

Filosa et al.

[11] Patent Number: 4,959,758
[45] Date of Patent: Sep. 25, 1990

[54] HEADLAMP ASSEMBLY

[75] Inventors: Philip C. Filosa; Robert G. Roeske; Bartley A. Haydu, all of Anderson, Ind.

[73] Assignee: General Motors Corporation, Detroit, Mich.

[21] Appl. No.: 386,167

[22] Filed: Jul. 28, 1989

[51] Int. Cl.⁵ .................................. B60Q 1/06
[52] U.S. Cl. ........................... 362/66; 362/80; 362/273; 362/289; 362/421
[58] Field of Search ............ 362/61, 66, 69, 70, 362/80, 269, 271, 273, 275, 285, 287, 289, 419, 421

[56] References Cited

U.S. PATENT DOCUMENTS

| 4,689,725 | 8/1987 | Saijo et al. | 362/66 |
| 4,722,029 | 1/1988 | Ahle et al. | 362/66 |
| 4,742,435 | 5/1988 | Van Duyn et al. | 362/66 |

Primary Examiner—Stephen F. Husar
Attorney, Agent, or Firm—Edward J. Biskup

[57] ABSTRACT

A headlamp assembly having a lamp unit supported by three ball pivots each of which is connected to the reflector member of the lamp unit by a bearing member which encloses substantially all of the ball portion so as to prevent foreign material from entering the spherical bearing surface provided by the bearing member.

2 Claims, 3 Drawing Sheets

HEADLAMP ASSEMBLY

This invention concerns vehicle headlamps and more particularly relates to a headlamp assembly which is connected to a support panel by a plurality of ball pivots which allow relative adjustable movement of the lamp body about a horizontal aim axis and a vertical aim axis.

More specifically, the headlamp assembly according to the present invention includes a plastic reflector member the front end of which is closed by a lens and the rear end of which is integrally formed with a plurality of enlarged bosses. Each of the bosses has a cavity located therein that opens to the rear of the reflector member and contains a bearing member which serves to connect one of the ball pivots to the lamp body of the headlamp assembly. The bearing member includes a first socket portion and a second socket portion each of which has a spherical bearing surface which together encapsulate a major portion of the ball pivot so as to limit foreign matter from gaining access to the spherical bearing surface surrounding the ball portion of the ball pivot. In addition, the bearing member has an outer configuration that provides an interference fit with the inner walls of the cavity when the bearing member is inserted into the cavity an fastened to the reflector member.

The objects of the present invention are to provide a new and improved headlamp assembly having a lamp unit that is removably attached to a pair of longitudinally adjustable ball pivots and to a fixed ball pivot so as to facilitate replacement of the lamp unit; to provide a new and improved headlamp assembly having a lamp unit supported by three ball pivots each of which is connected to the reflector member of the lamp unit through a pair of socket portions which encapsulate substantially all of the ball portion of the associated ball pivot so as to limit the ability of foreign material to enter the bearing surface between the socket portion and the ball portion; and to provide a new and improved headlamp assembly having a lamp unit attached through a ball pivot to a support panel and in which the ball pivot is connected to the reflector member of the lamp unit by a split bearing member having a pair of socket portions that are insertable from the rear of the lamp unit into a tapered cavity formed in the reflector member and are capable of being drawn into an interference fit with the inner wall of the cavity by screw means that are accessible from the front of the lamp unit.

One patent showing a headlamp assembly that has certain similarities to the present invention is U.S. Pat. No. 4,722,029 entitled "Vehicle Headlamp", in the name of Ahle et al and issued on Jan. 26, 1988. Although Ahle et al provides a bushing which is insertable into a tapered cavity formed in a reflector for connecting a spherical head to the reflector, the Ahle et al disclosure does not provide a bearing member as required by this invention which includes a pair of socket portions and serves to encapsulate substantially all of the ball portion of the ball pivot so as to limit access of foreign material to the bearing surface between the ball portion and :he socket portion. In addition, Ahle lacks fastening means such as provided by one embodiment of this invention, that are accessible from the front of the headlamp for disconnecting the ball pivot from the reflector member to facilitate replacement of the lamp unit.

Other objects and advantages of the present invention will be apparent from the following detail description of the invention when taken with the drawings in which FIG. 1 is an elevational view of the vehicle headlamp assembly made according to the present invention;

Figure 1:
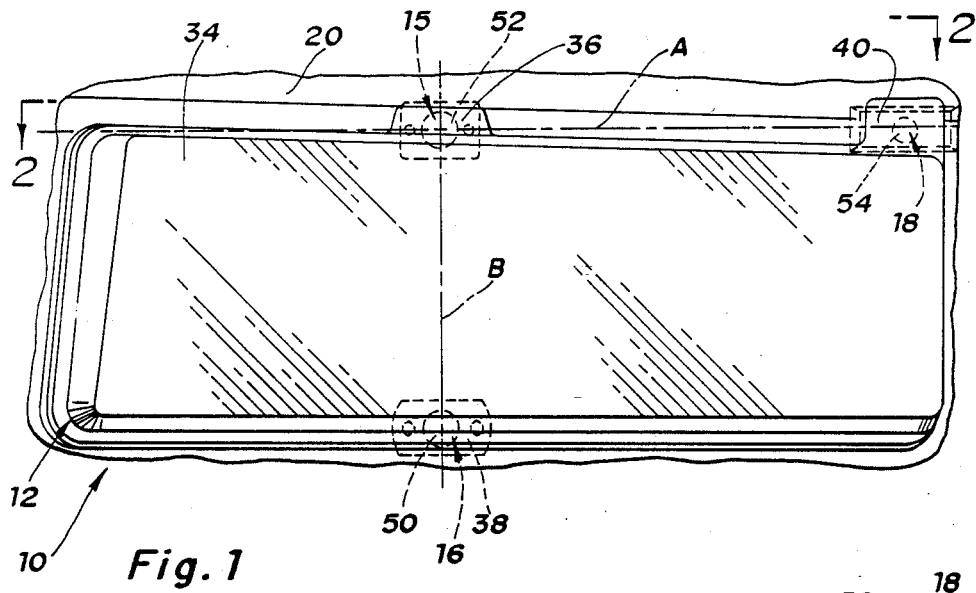
Figure 2:
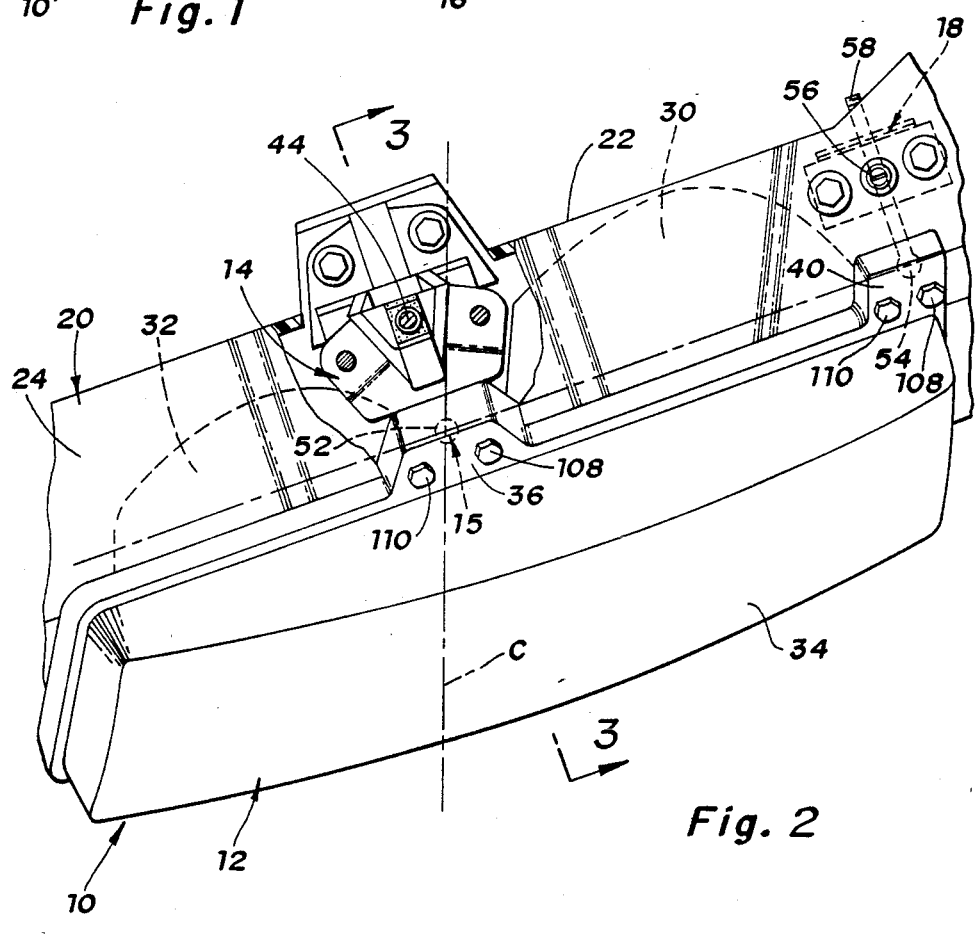
FIG. 2 is a plan view of the headlamp assembly taken on lines 2—2 of FIG. 1.
Figure 3:
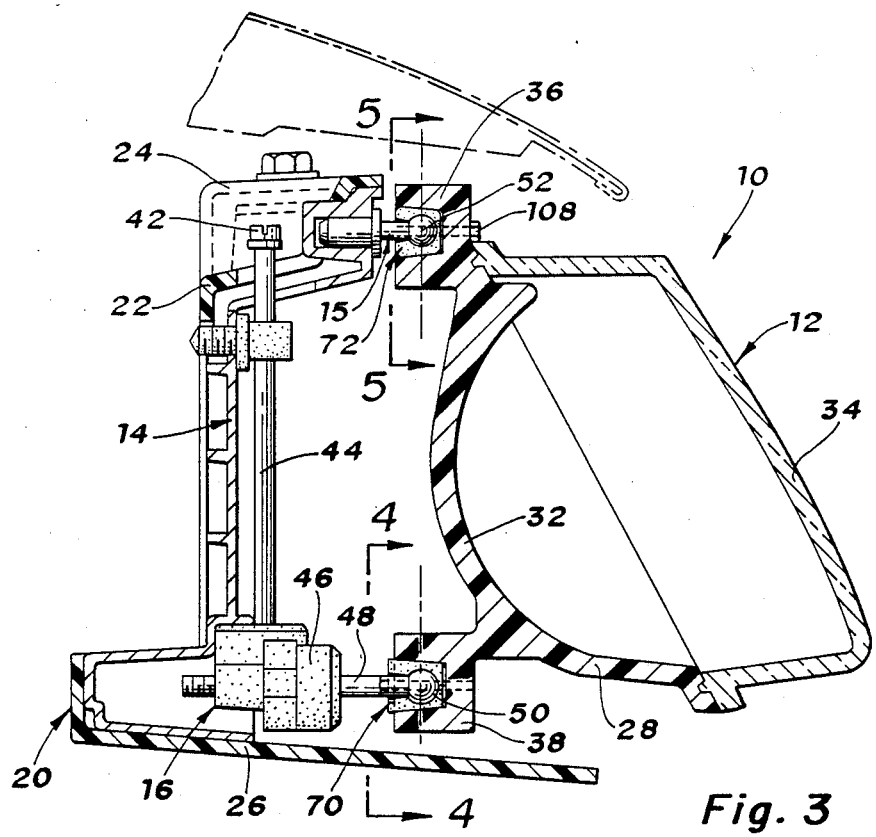
FIG. 3 is an enlarged sectional view taken on line 3—3 of FIG. 2.

Referring now to the drawings and more particularly FIGS. 1, 2 and 3 thereof, a headlamp assembly 10 is shown of the replaceable light bulb composite type made according to the present invention. The headlamp assembly 10 includes a lamp body 12, a center pivot bracket 14 supporting a fixed ball pivot member 15 and combined with an adjustment mechanism 16 for lamp positioning about a horizontal aim axis A and an adjustment mechanism 18 for lamp positioning about a vertical aim axis B. The headlamp assembly 10 is normally shipped as a unit to a vehicle manufacturer and thereafter is mounted to a support panel 20 at the front end of a motor vehicle so as to permit selective adjustable movement of the lamp body 12 in a horizontal plane containing the horizontal aim axis A and the vertical plane containing the vertical aim axis B.

The support panel 20, in this case, is made of a plastic material and is fastened to the sheet metal structure (not shown) at the front portion of the motor vehicle. The support panel 20 includes a back wall 22 integral with a pair of vertically spaced generally horizontal top and bottom walls 24 and 26, respectively, to which are fastened the bracket 14 and the adjustment mechanisms 16 and 18 which mounts the headlamp assembly 10 to the support panel 20 and also serves to reposition the lamp body about the aforementioned vertical aim axis B and the horizontal aim axis A.

The lamp body 12 includes a plastic reflector member 28 formed with a pair of side by side parabolic cavities 30 and 32, the inner concave surface of each of which is aluminized so as to project a light beam forwardly and substantially parallel to an axis C as seen in FIG. 2. It will be noted that as shown in FIG. 2, the axis C is parallel to the longitudinal center axis of the associated vehicle (not shown) and the headlamp assembly would be the right-hand unit when looking at the front end of the vehicle as seen in FIG. 1. It should be apparent that the angled position of the headlamp unit is due to the rounded streamlined front end design currently popular with motor vehicles. Also, each of the parabolic cavities 30 and 32 is provided with a single filament replaceable bulb (not shown) located so as to cause the associated aluminized parabolic concave surface to project a light beam forwardly of the vehicle. The light bulb in the cavity 30 is provided with a filament located so as to allow the associated parabolic surface to project the so-called low beam when energized while the light bulb in the cavity 32 projects the so-called high beam when the filament thereof is energized. Thus, the lamp body 12 is actually two separate headlamps, a low beam unit and a high beam unit, joined together so as to facilitate the aiming adjustment of both lamps.

The front of the reflector member 28 is closed by a glass or the like material lens 34, the rear marginal portion of which is sealingly received by a channel as seen in FIG. 3 provided around the entire margin of the front portion of the reflector member 28. At a point located between the cavities 30 and 32 of the reflector member 28 and integrally formed therewith with are a pair of vertically aligned and spaced enlarged bosses 36 and 38 which extend rearwardly from the reflector member 28. A similar enlarged boss 40 is integrally formed as seen in FIGS. 1 and 2 at the right hand upper corner of the reflector member 28.

The bracket 14 as well as the adjustment mechanisms 16 and 18 for positioning the lamp body 12 about the horizontal aim axis A and the vertical aim axis B are identical to the corresponding components seen in U.S. Pat. No. 4,742,435 entitled "Support Arrangement for a Vehicle Headlamp" in the name of Van Duyn et al and issued on May 3, 1988. Accordingly, reference is made to that patent for a detailed description of the construction of each of the adjustment mechanisms 16 and 18 and the bracket 14. For present purposes, it should suffice to mention that when a screwdriver or the like is applied to the head 42 of the shaft 44 and rotated, bevel gears (not shown) located in the housing 46 will cause axial movement of a threaded shaft 48 at the end of which is formed with a spherical ball pivot 50. Thus, when the head 42 of adjuster mechanism 16 is rotated the associated threaded shaft 48 will move axially and cause adjustment of the lamp body 12 about the horizontal aim axis A which passes through the center of a ball pivot 52 of the ball pivot member 15 and the center of adjustable ball pivot 54 of the adjustment mechanism 18. On the other hand, when the head 56 of the adjustment mechanism 18 is rotated, the associated threaded shaft 58 will move axially and cause the lamp body 12 to be adjusted about the vertical aim axis B which passes through the centers of the ball pivot 52 fixed in position on the upper end of the bracket 14 and the adjustable ball pivot 50 of adjustment mechanism 16.

Figure 6:
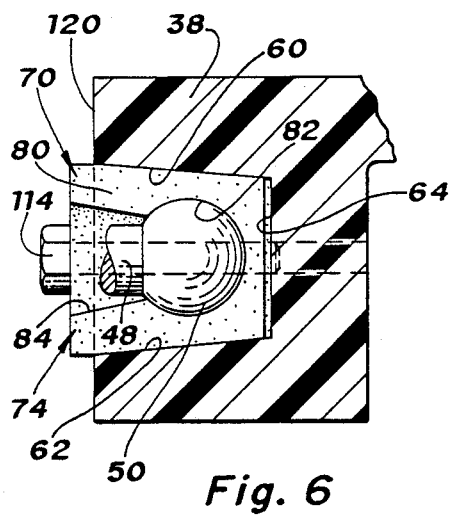
FIG. 6 is a sectional view of the bearing member of FIG. 4 taken on line 6—6.
Figure 7:
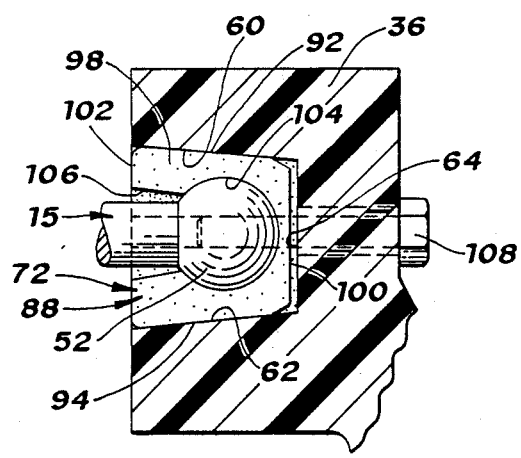
FIG. 7 is a sectional view of the bearing member of FIG. 5 taken on line 7—7 thereof.

It will be noted that the enlarged bosses 36, 38 and 40 are each formed with a cavity that opens to the rear of the reflector member 28. Each of the cavities as seen in FIGS. 6 and 7, has the upper wall 60 and lower wall 62 thereof tapered towards a point located forwardly of the lamp body 12. Each cavity also includes a back wall 64 and a pair of laterally spaced side walls 66 and 68 which also are tapered toward a point located forwardly of the lamp body 12. It will be noted that in the case of the cavity formed in the boss 38 and seen in FIGS. 4 and 6, the associated cavity is frusto-conical in configuration with curved top, bottom and side walls and serves to accommodate the bearing member 70 seen in FIGS. 4 and 6. On the other hand, the cavity formed in the boss 36 has straight top, bottom, and side walls and serves to accommodate a bearing member 72 which is a modified form of the bearing member 70. Whether the cavity is square, rectangular, or round in cross section, the taper of opposing walls should be no more than 6° total for obtaining a self-locking condition.

Figure 4:
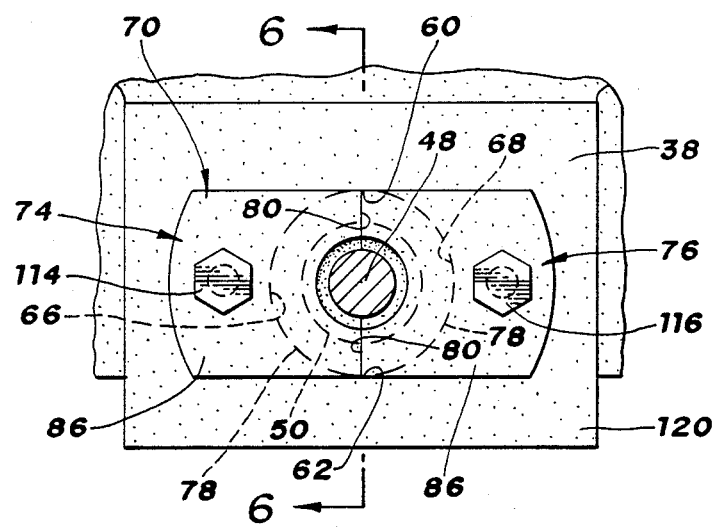
FIG. 4 is an enlarged view taken on line 4—4 of FIG. 3 of one form of a bearing member incorporated in the headlamp assembly of FIGS. 1-3.
Figure 8:
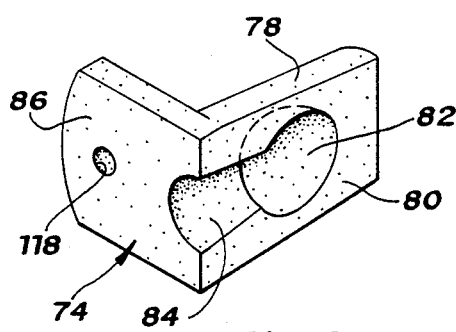
FIG. 8 is a perspective view of one of the two socket portions which constitutes the bearing member seen in FIGS. 4 and 6.

In each case, a two-piece bearing member is located in each of the cavities formed in the bosses 36, 38 and 40 and, in this regard, it will be noted that the bearing member 70 comprises a first socket portion 74 and a second socket portion 76 which is a mirror image of the first socket portion 74. As seen in FIG. 8, the socket portion 74 shown as well as the socket portion 76 includes an insertable part comprising a curved outer surface 78 and a planar inner surface 80 which has a semi-spherical cavity 82 formed therein which connects with a half frusto-conical cavity 84 also formed in the surface 80. The insertable part is also formed with an arm 86 which extends laterally outwardly from the cavity 84 for mounting to the boss 38 as will hereinafter be explained. The two socket portions 74 and 76, when joined together at the surface 80 as seen in FIGS. 4 and 6 provide an insertable part having an outer size and configuration which substantially conforms o the size and configuration of the cavity in the boss 38. Also, the semi-spherical cavities 82 of the socket portions 74 and 76 provide a bearing surface for the ball pivot 50 and essentially completely encapsulate ball pivot 50 so as to prevent foreign material from gaining access into the area between the outer bearing surface of the ball pivot 50 and the spherical bearing surface of bearing member 70.

Figure 5:
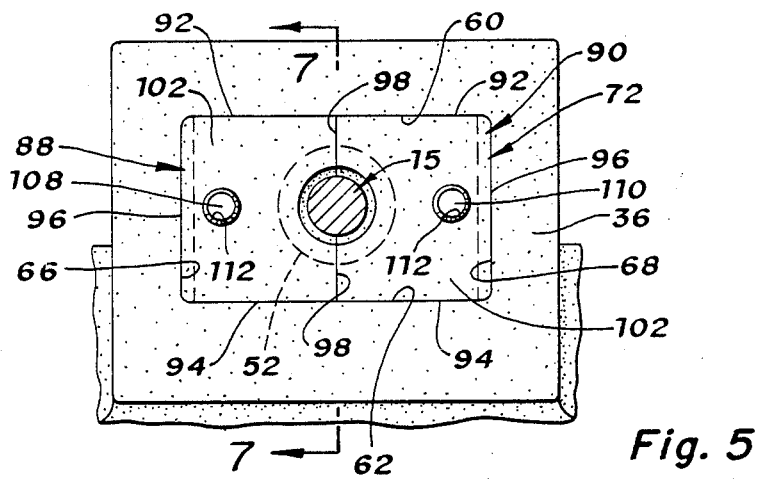
FIG. 5 is an enlarged view taken on line 5—5 of FIG. 3 of another form of a bearing member employed with the headlamp assembly.
Figure 9:
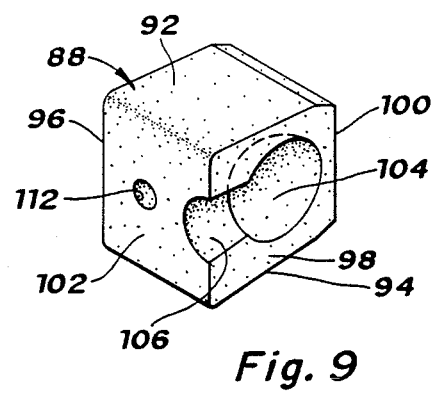
FIG. 9 is a perspective view of one of the two socket portions which constitutes the bearing member seen in FIGS. 5 and 7.

The bearing member 72 is similar to the bearing member 70 except that the insertable part, rather than having a curved outer surface, is formed with outer walls which are planar. Thus, as seen in FIG. 9, one socket portion 88 is shown and the other socket portion as seen in FIG. 5, is a mirror image thereof and identified by reference numeral 90. Each of the socket portions 88 and 90, as seen in FIGS. 5, 7 and 9 is defined by a top wall 92, a bottom wall 94, a side wall 96, and a contact surface 98, all of which are planar. Each socket portion 88 and 90 is also provided with a pair of planar end walls 100 and 102. Also, the contact surface 98 of each socket portion 88 and 90 is formed with a semi-spherical cavity 104 for receiving the ball pivot 52 and connects with a half frusto-conical cavity 106. Thus, as in the case with the bearing member 70, when the socket portion 88 and 90 of bearing member 72 are joined together with the surfaces 98 in contact with each other as seen in FIG. 5, the bearing member 72 takes the form of an insertable part having an outer size and configuration which substantially conforms to the size and configuration of the cavity in the boss 36. Also, the semi-spherical cavities 104 provide a bearing surface for the ball point pivot 52 and essentially completely encapsulate ball pivot 52 so as to prevent foreign material from entering into the area between the spherical bearing 104 and the outer spherical surface of the ball pivot 52. It will be noted that the ball pivot 54 of the adjustment mechanism 18 is connected to the boss 40 by a bearing member identical to the bearing member 72 located in a cavity identical to the cavity formed in the boss 36.

During the assembly of the bracket 14, the fixed ball pivot 52 and the adjustment mechanisms 16 and 18 to the lamp body 12, each ball pivot 50, 52, and 54 will initially be encapsulated by the bearing member as described above and the bearing member so assembled will be inserted into the appropriate cavity in the lamp body 12. As seen in FIGS. 2, 5, 7 and 9, cap or headed screws 108 and 110 are then passed through a pair of bores formed in the frontal portion of each boss 36 and 40 and then threaded into the through bores 112 formed in each of the socket portions 88 and 90 so as to draw the latter tightly into the associated cavity. As seen in FIGS. 3, 4, 6 and 8, the screws 114 and 116 will pass through suitable bores 118 formed in the arms 86 of the bearing member 70 into the rear portion of boss 38 and fasten the bearing member to the associated boss. By providing a small amount of clearance between the arm 86 and the rear vertical surface 120 of the boss 38, tightening of the screws 114 and 116 will tend to firmly wedge the bearing member 70 in the accommodating cavity. A similar clearance between the end wall 100 of bearing member 72 and back wall 64 provides a similar result when the screws 108 and 110 are tightened.

As alluded to above, each bearing member 70 and 72 substantially completely encloses the associated ball pivot to prevent dirt and other foreign material from entering the area between the ball pivot and the bearing surface formed in each socket portion. Thus, as seen in FIGS. 6 and 7, a minor portion of the spherical outer surface of the ball pivot will be exposed so as to allow the ball pivot to rotate in a plane from one full stop to the other full stop only a few degrees (approximately 5 degrees) to allow adjustment of the lamp body 12 about the aim axes when the shafts 48 and 58 move axially. In other words, only sufficient clearance is provided for ball pivot movement to realize adjustment of the lamp body about the aim axes as required by the U.S. Federal Standards on vehicle lighting.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. The combination with a headlamp assembly adapted to be mounted to a support panel at the front end of a motor vehicle through a pair of longitudinally adjustable ball pivots and a fixed ball pivot so as to allow selective adjustable movement of the lamp body about a vertical aim axis and horizontal aim axis, said lamp body including a reflector member the front of which is closed by a lens and the rear of which is integrally formed with a plurality of enlarged boss portions, each of said boss portions having a tapered wall cavity that opens to the rear of said reflector member, a bearing member located in each of said cavities and serving to connect one of said ball pivots to said lamp body, said bearing member comprising two mirror image portions which when combined provide a spherical bearing surface which encapsulates essentially the entire ball portion of the associated ball pivot so as to prevent foreign material from gaining access to said spherical bearing surface, said bearing member having an outer configuration that conforms with the tapered inner walls of said cavity in which said bearing member is inserted, and fastener means accessible from the front of said reflector member for securing each of said mirror image portions to said reflector member.

2. The combination with a headlamp assembly adapted to be mounted to a support panel at the front end of a motor vehicle through a pair of longitudinally adjustable ball pivots and a fixed ball pivot so as to allow selective adjustable movement of the lamp body about a vertical aim axis and horizontal aim axis, said lamp body including a reflector member the front of which is closed by a lens and the rear of which is integrally formed with a plurality of enlarged boss portions, each of said boss portions having a cavity that opens to the rear of said reflector member, a bearing member located in said cavity and serving to connect one of said ball pivots to said lamp body, said bearing member including a first socket portion and a second socket portion providing a spherical bearing surface which encapsulates substantially the entire ball portion of the associated ball pivot so as to prevent foreign material from gaining access to said spherical bearing surface, said bearing member having an outer configuration that provides an interference fit with the inner walls of said cavity in which said bearing member is inserted, and screw means accessible from the front of said reflector member for securing each of said socket portions to said reflector member so as to facilitate removal of said lamp unit from the associated ball pivot.

* * * * *